US010768706B1

(12) United States Patent
Wang et al.

(10) Patent No.: US 10,768,706 B1
(45) Date of Patent: Sep. 8, 2020

(54) DETERMINING AN AMPLITUDE OF A BRAKING PORTION OF A WAVEFORM OF A DRIVING VOLTAGE SIGNAL FOR A LINEAR RESONANT ACTUATOR

(71) Applicant: Google LLC, Mountain View, CA (US)

(72) Inventors: Jianxun Wang, Sunnyvale, CA (US); Debanjan Mukherjee, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/404,875

(22) Filed: May 7, 2019

(51) Int. Cl.
*G06F 3/01* (2006.01)
*G06F 3/0488* (2013.01)

(52) U.S. Cl.
CPC .......... *G06F 3/016* (2013.01); *G06F 3/04886* (2013.01)

(58) Field of Classification Search
CPC ............... G06F 3/016; G06F 2203/013; G06F 2203/014; G06F 2203/015; G06F 3/0219; G06F 3/0362; G06F 3/038; G06F 3/0489; G06F 1/1626; G06F 1/1684; G06F 1/1694; H04M 1/72569; B06B 1/023; B06B 2201/52; B06B 2201/53; G10L 2021/02166; G10L 25/30; G10L 25/51; H02P 25/032
See application file for complete search history.

(56) References Cited

U.S. PATENT DOCUMENTS 9,830,782 B2    11/2017  Morrell
2011/0163985 A1*  7/2011  Bae ........................ G06F 3/016
                                                345/173
2011/0260990 A1   10/2011  Ali
2012/0110758 A1    5/2012  Kanazawa
2013/0088439 A1    4/2013  Shih
2014/0176415 A1*   6/2014  Buuck ..................... G06F 3/016
                                                345/156

(Continued)

FOREIGN PATENT DOCUMENTS

CN    108334193 A    7/2018
JP    2018026121 A   2/2018
KR    20170032452 A   3/2017

OTHER PUBLICATIONS

Wikipedia, "Touchscreen", https://en.wikipedia.org/wiki/Touchscreen, printed Apr. 3, 2019, 16 pages.
Wikipedia, "Q factor", https://en.wikipedia.org/wiki/Q_factor, printed Mar. 8, 2019, 9 pages.
Precision Microdrives, "Introduction to Haptic Feedback", https://www.precisionmicrodrives.com/haptic-feedback/introduction-to-haptic-feedback/, printed Apr. 17, 2019, 4 pages.

(Continued)

*Primary Examiner* — Sanjiv D. Patel
(74) *Attorney, Agent, or Firm* — Shumaker & Sieffert, P.A.

(57) ABSTRACT

An amplitude of a braking portion of a waveform of a driving voltage signal for a linear resonant actuator can be determined. A measure of a characteristic of the linear resonant actuator can be obtained. The characteristic can be different from a quality factor of the linear resonant actuator. The quality factor can be determined based on the measure of the characteristic. The amplitude of the braking portion of the waveform of the driving voltage signal can be determined based on the quality factor. Data for a driving voltage signal circuitry can be set, based on the amplitude, to cause the driving voltage circuitry to produce the driving voltage signal. The driving voltage signal can have (e.g., define) the waveform in which the braking portion has the amplitude.

25 Claims, 12 Drawing Sheets

(56) References Cited

U.S. PATENT DOCUMENTS

| | | | |
|---|---|---|---|
| 2014/0247227 A1 | 9/2014 | Jiang et al. | |
| 2015/0084875 A1 | 3/2015 | Liu | |
| 2016/0063826 A1* | 3/2016 | Morrell | H04M 19/047 |
| | | | 340/407.1 |
| 2016/0163165 A1 | 6/2016 | Morrell et al. | |
| 2016/0195931 A1 | 7/2016 | Czelnik | |
| 2016/0259480 A1* | 9/2016 | Augenbergs | G06F 3/016 |
| 2017/0052593 A1* | 2/2017 | Jiang | G06F 3/016 |
| 2017/0169674 A1* | 6/2017 | Macours | G08B 6/00 |
| 2018/0033262 A1 | 2/2018 | Shah et al. | |
| 2018/0065151 A1 | 3/2018 | Houston et al. | |
| 2018/0075715 A1 | 3/2018 | Morrell et al. | |
| 2018/0292601 A1 | 10/2018 | Weber | |
| 2019/0064997 A1 | 2/2019 | Wang | |
| 2019/0204922 A1 | 7/2019 | Deng et al. | |

OTHER PUBLICATIONS

Somatic Labs, "How it Works: Linear Resonant Actuators", https://blog.somaticlabs.io/how-it-works-linear-resonant-actuators/, printed Apr. 2, 2019, 7 pages.

Wikipedia, "Haptic technology", https://en.wikipedia.org/wiki/Haptic_technology, printed Mar. 8, 2019, 13 pages.

Precision Microdrives, "AB-020: Understanding Linear Resonant Actuator Characteristics", https://www.precisionmicrodrives.com/content/ab-020-understanding-linear-resonant-actuator-characteristics/, printed Apr. 3, 2019, 6 pages.

"Measuring the Q-factor of a resonator with the ring-down method", http://www.giangrandi.ch/electronics/ringdownq/ringdownq.shtml, printedJan. 22, 2019, 15 pages.

International Search Report and Written Opinion of International Application No. PCT/US2019/064048, dated Mar. 20, 2020, 16 pp.

* cited by examiner

602

702 — Determine a corresponding quality factor for each member of a set of linear resonant actuators

704 — Determine, for each member of the set of linear resonant actuators, a corresponding amplitude of a corresponding braking portion of a corresponding waveform of a corresponding driving voltage signal to cause a corresponding linear resonant actuator to oscillate with an acceleration having an amplitude that is less than or equal to a specific percentage of an amplitude of an acceleration of an oscillation of the corresponding linear resonant actuator caused by a corresponding driving portion of the corresponding waveform of the corresponding driving voltage signal

706 — Determine a line associated with a plot of amplitudes of braking portions of waveforms of driving voltage signals of the linear resonant actuators versus quality factors of the linear resonant actuators

708 — Determine the function based on the line

802 — Obtain a measure of a voltage as a function of a time in response to a sinusoidal chirp signal applied to the linear resonant actuator

804 — Obtain a measure of a current as a function of the time in response to the sinusoidal chirp signal applied to the linear resonant actuator

902 — Determine a difference between two adjacent maximum amplitudes of an acceleration of an oscillation of the linear resonant actuator in response to a pulse signal applied to the linear resonant actuator

904 — Determine a duration of time between a larger maximum amplitude, of the two adjacent maximum amplitudes, and a smaller maximum amplitude of the two adjacent maximum amplitudes

1002 Determine an impedance as a function of a frequency

1004 Determine, from the impedance as the function of the frequency, a maximum impedance and a first frequency

1006 Obtain a resistance of the linear resonant actuator

1008 Determine, from the impedance as the function of the frequency, from the maximum impedance, and from the resistance, an impedance associated with the quality factor, a second frequency, and a third frequency

1010 Determine the quality factor from the first frequency, the second frequency, the third frequency, the maximum impedance, and the resistance

1102 — Determine a voltage as a function of the frequency from the voltage as the function of the time 1104 — Determine a current as a function of the frequency from the current as the function of the time 1106 — Determine the impedance as the function of the frequency from the voltage as the function of the frequency and the current as the function of the frequency

1202 — Obtain a measure of a voltage as a function of a time in response to a pilot tone applied to the linear resonant actuator

1204 — Obtain a measure of a current as a function of the time in response to the pilot tone applied to the linear resonant actuator

1206 — Determine a fast Fourier transform of the voltage as the function of the time in response to the pilot tone

1208 — Determine a fast Fourier transform of the current as the function of the time in response to the pilot tone

1210 — Determine a quotient of the fast Fourier transform of the voltage as the function of the time in response to the pilot tone divided by the fast Fourier transform of the current as the function of the time in response to the pilot tone

1212 — Determine a real part of the quotient

FIG. 12

DETERMINING AN AMPLITUDE OF A BRAKING PORTION OF A WAVEFORM OF A DRIVING VOLTAGE SIGNAL FOR A LINEAR RESONANT ACTUATOR

BACKGROUND

In addition to visual and aural modes of communicating information, an electronic device can also be configured to communicate information in a haptic (or tactile) manner: causing a user to receive the information through a sense of touch. Haptic technology, included in an electronic device, can be used to communicate information for a variety of reasons. Such reasons can include providing a feedback signal to a user in response to a receipt of an input signal caused by the user. Such a feedback signal can provide the user with confirmation that the input signal was received. Such a feedback signal often can be in a form of a vibration (or a pattern of vibrations) of a housing of the electronic device. Various haptic technologies can be used to produce such vibrations. Such haptic technologies can include, for example, piezoelectric actuators, eccentric rotating mass actuators, and linear resonant actuators.

BRIEF SUMMARY

According to an implementation of the disclosed technologies, an amplitude of a braking portion of a waveform of a driving voltage signal for a linear resonant actuator can be determined. A measure of a characteristic of the linear resonant actuator can be obtained. The characteristic can be different from a quality factor of the linear resonant actuator. The quality factor can be determined based on the measure of the characteristic. The amplitude of the braking portion of the waveform of the driving voltage signal can be determined based on the quality factor. Data for a driving voltage signal circuitry can be set, based on the amplitude, to cause the driving voltage circuitry to produce the driving voltage signal. The driving voltage signal can have (e.g., define) the waveform in which the braking portion has the amplitude.

According to an implementation of the disclosed technologies, a system for determining an amplitude of a braking portion of a waveform of a driving voltage signal for a linear resonant actuator can include a memory and a processor. The memory can be configured to store a measure of a characteristic of the linear resonant actuator and data for a driving voltage signal circuitry. The processor can be configured to obtain the measure of the characteristic of the linear resonant actuator. The characteristic can be different from a quality factor of the linear resonant actuator. The processor can be configured to determine, based on the measure of the characteristic, the quality factor. The processor can be configured to determine, based on the quality factor, the amplitude of the braking portion of the waveform of the driving voltage signal. The processor can be configured to set, based on the amplitude, the data for the driving voltage signal circuitry to cause the driving voltage circuitry to produce the driving voltage signal. The driving voltage signal can have (e.g., define) the waveform in which the braking portion has the amplitude.

According to an implementation the disclosed technologies, a non-transitory computer-readable medium storing computer code for controlling a processor to cause the processor to determine an amplitude of a braking portion of a waveform of a driving voltage signal for a linear resonant actuator determining an amplitude of a braking portion of a waveform of a driving voltage signal for a linear resonant actuator can include instructions. The instructions can include instruction to cause the processor to obtain a measure of a characteristic of the linear resonant actuator. The characteristic can be different from a quality factor of the linear resonant actuator. The instructions can include instruction to cause the processor to determine, based on the measure of the characteristic, the quality factor. The instructions can include instruction to cause the processor to determine, based on the quality factor, the amplitude of the braking portion of the waveform of the driving voltage signal. The instructions can include instruction to cause the processor to set, based on the amplitude, data for a driving voltage signal circuitry to cause the driving voltage circuitry to produce the driving voltage signal. The driving voltage signal can have (e.g., define) the waveform in which the braking portion has the amplitude.

According to an implementation the disclosed technologies, a system for determining an amplitude of a braking portion of a waveform of a driving voltage signal for a linear resonant actuator can include means for obtaining a measure of a characteristic of the linear resonant actuator. The characteristic can be different from a quality factor of the linear resonant actuator. The system can include means for determining, based on the measure of the characteristic, the quality factor. The system can include means for determining, based on the quality factor, the amplitude of the braking portion of the waveform of the driving voltage signal. The system can include means for setting, based on the amplitude, data for a driving voltage signal circuitry to cause the driving voltage circuitry to produce the driving voltage signal. The driving voltage signal can have (e.g., define) the waveform in which the braking portion has the amplitude.

Additional features, advantages, and embodiments of the disclosed technologies are set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed technologies, are incorporated in and constitute a part of this specification. The drawings also illustrate embodiments of the disclosed technologies and together with the detailed description serve to explain the principles of implementations of the disclosed technologies. No attempt is made to show structural details in more detail than may be necessary for a fundamental understanding of the disclosed technologies and various ways in which it may be practiced.

FIG. 7 is a flow diagram of an example of a method for determining, based on a quality factor of the linear resonant actuator, the amplitude of the braking portion of the waveform of the driving voltage signal.

FIG. 8 is a flow diagram of an example of a first method for obtaining a measure of a characteristic of the linear resonant actuator, according to the disclosed technologies.

FIG. 9 is a flow diagram of an example of a second method for obtaining the measure of the characteristic of the linear resonant actuator, according to the disclosed technologies.

FIG. 10 is a flow diagram of an example of a first method for determining the quality factor based on the measure of the characteristic, according to the disclosed technologies.

FIG. 11 is a flow diagram of an example of a method for determining an impedance as a function of a frequency, according to the disclosed technologies.

FIG. 12 is a flow diagram of an example of a method for obtaining a resistance of the linear resonant actuator, according to the disclosed technologies.

DETAILED DESCRIPTION

Figure 1:
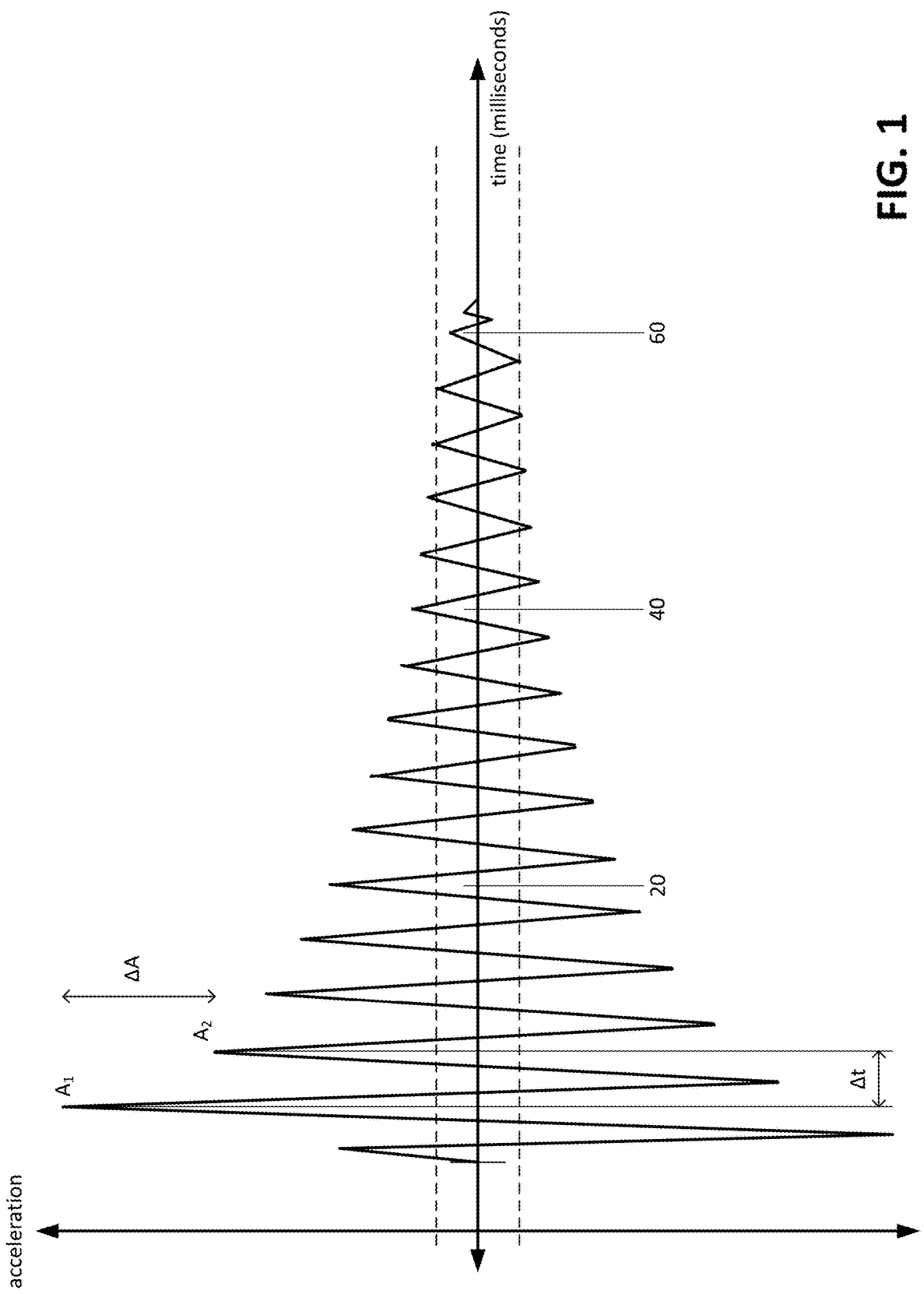
FIG. 1 illustrates a graph of acceleration versus time in response to a pulse signal applied to an exemplary linear resonant actuator.

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In addition to visual and aural modes of communicating information, an electronic device can also be configured to communicate information in a haptic (or tactile) manner: causing a user to receive the information through a sense of touch. Haptic technology, included in an electronic device, can be used to communicate information for a variety of reasons. Such reasons can include providing a feedback signal to a user in response to a receipt of an input signal caused by the user. Such a feedback signal can provide the user with confirmation that the input signal was received. Such a feedback signal often can be in a form of a vibration (or a pattern of vibrations) of a housing of the electronic device. Various haptic technologies can be used to produce such vibrations. Such haptic technologies can include, for example, piezoelectric actuators, eccentric rotating mass actuators, and linear resonant actuators.

A feedback signal provided through haptic technology can often be used in conjunction with a feedback signal provided through another technology. For example, a housing of an electronic device can include a touchscreen. The electronic device can be configured to present a graphical user interface on the touchscreen. The graphical user interface can include a button type graphical control element. The graphical user interface can be configured so that, in response to a receipt of an input signal via the button type graphical control element, both a haptic feedback signal (e.g., a vibration) and a visual feedback signal (e.g., a change in the information displayed on the touchscreen) can be produced.

The feedback signal provided through the haptic technology often can be faster than the feedback signal provided through the other technology. For example, in the touchscreen example described above, often the user can perceive the haptic feedback signal before the user perceives the visual feedback signal. This can particularly be the case when the haptic technology is a linear resonant actuator. A linear resonant actuator can have a start time of approximately five to ten milliseconds, which can be a fraction of the time required to produce a vibration with an eccentric rotating mass actuator.

A linear resonant actuator can include, for example, a coil, a magnetic mass, and a spring. A driving voltage signal having an alternating current waveform can be applied to the coil (e.g., in response to the receipt of the input signal caused by the user). A current produced in the coil by the driving voltage signal can interact with the magnetic field produced by the magnetic mass to produce a Lorentz force. The Lorentz force can impart a motion to the magnetic mass. Because the driving voltage signal has an alternating current waveform, the motion of the magnetic mass can take the form of oscillations (i.e., vibrations). The magnetic mass can be attached to the spring. Typically, the alternating current waveform can cause the oscillations to occur at a resonant frequency of a combination of the magnetic mass and the spring. Friction within the linear resonant actuator can dampen the motion.

A measure of a rate of damping of the linear resonator actuator can be characterized by a quality factor. The quality factor can be equal to a quotient of the resonant frequency divided by a difference in frequencies. The difference in frequencies can be equal to a lower frequency subtracted from a higher frequency. The lower frequency can be a frequency, less than the resonant frequency, at which an amplitude of a power of vibrations is equal to half of an amplitude of the power of vibrations at the resonant frequency. The higher frequency can be a frequency, greater than the resonant frequency, at which an amplitude of the power of vibrations is equal to half of the amplitude of the power of vibrations at the resonant frequency.

Unfortunately, a linear resonant actuator can have a stop time of approximately 60 milliseconds, which can be significantly longer than the stop time of an eccentric rotating mass actuator. The stop time can be a time at which an amplitude of an acceleration of the linear resonant actuator is less than a specific percentage of an initial amplitude of the acceleration of the linear resonant actuator in response to a pulse signal applied to the linear resonant actuator.

FIG. 1 illustrates a graph of acceleration versus time in response to a pulse signal applied to an exemplary linear resonant actuator. As illustrated in FIG. 1, for example, if the stop time is the time at which the amplitude of the acceleration of the exemplary linear resonant actuator is less than ten percent of the initial amplitude of the acceleration of the exemplary linear resonant actuator in responses to the pulse signal applied to the exemplary linear resonant actuator, then the stop time can be approximately 60 milliseconds.

Such a long stop time can present a problem in a situation in which: (1) the linear resonant actuator is used to provide a feedback signal to a user in response to a receipt of an input signal caused by the user and (2) a rate of input signals caused by the user is faster than the stop time of the linear resonator actuator. For example, in the touchscreen example described above, if: (1) the button type graphical control element represents one of several button type graphical control elements on a graphical user interface for an electronic game and (2) the input signals are caused by touches, by the user, of the several button type graphical control elements at a rate of 50 touches per second, then the rate of input signals caused by the user (i.e., one touch every 20 milliseconds) can be faster than the stop time of the linear resonator actuator (i.e., approximately 60 milliseconds).

Similarly, for example, the button type graphical control element can represent a key on a keyboard displayed on the touchscreen.

Figure 2:
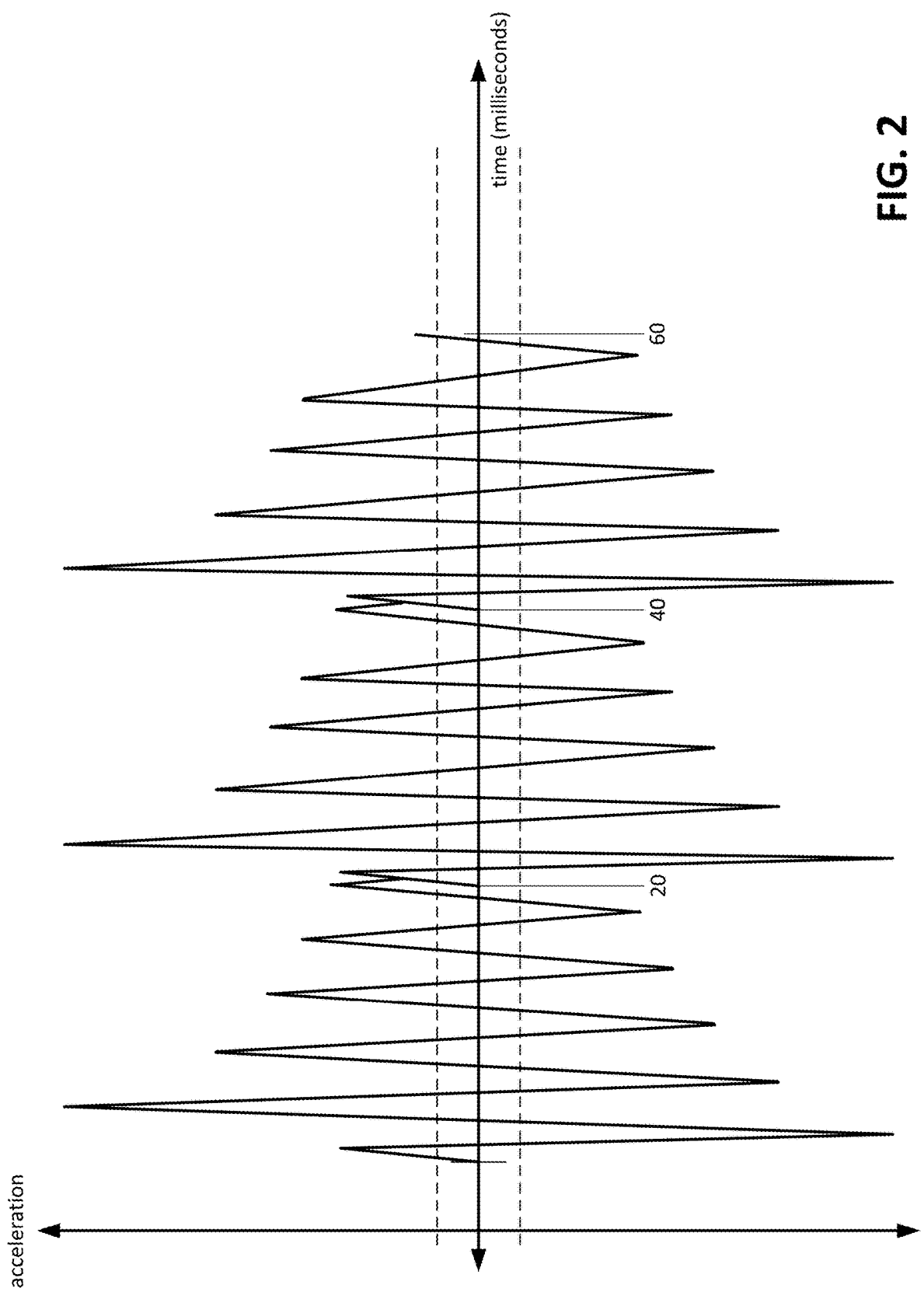
FIG. 2 illustrates a graph of acceleration versus time in a situation in which a rate of pulse signals applied to an exemplary linear resonant actuator is faster than a stop time of the exemplary linear resonant actuator.

FIG. 2 illustrates a graph of acceleration versus time in a situation in which a rate of pulse signals applied to an exemplary linear resonant actuator is faster than a stop time of the exemplary linear resonant actuator.

Because a receipt of a subsequent input signal (e.g., a subsequent touch of a button type graphical control element on the graphical user interface for the electronic game) can occur before the amplitude of the acceleration of the linear resonant actuator is less than a specific percentage of an initial amplitude of an acceleration of the linear resonant actuator in response to a pulse signal applied to the linear resonant actuator, vibrations of the electronic device, at a time of the receipt of the subsequent input signal, can be sufficiently large that the user cannot distinguish between the feedback signal intended to provide confirmation that an initial input signal was received (e.g., a touch of an initial button type graphical control element on the graphical user interface for the electronic game) and the feedback signal intended to provide confirmation that the subsequent input signal was received (e.g., the subsequent touch of the button type graphical control element on the graphical user interface for the electronic game).

Similarly, because the receipt of the subsequent input signal (e.g., a strike of a subsequent key on the keyboard) can occur before the amplitude of the acceleration of the linear resonant actuator is less than the specific percentage of the initial amplitude of the acceleration of the linear resonant actuator in response to the pulse signal applied to the linear resonant actuator, vibrations of the electronic device, at the time of the receipt of the subsequent input signal, can be sufficiently large that the user cannot distinguish between the feedback signal intended to provide confirmation that the initial input signal was received (e.g., a strike of an initial key on the keyboard) and the feedback signal intended to provide confirmation that the subsequent input signal was received (e.g., the strike of the subsequent key on the keyboard).

Such a situation can not only detract from an aesthetic experience of the user in using the electronic device, but can also cause the user to use the electronic device at a slower rate than the user would use the electronic device in an absence of such a situation.

To address this concern, a waveform of a driving voltage signal for the linear resonant actuator can include, in addition to a driving portion that causes, at a first time, the linear resonant actuator to oscillate at a resonant frequency with an acceleration having a first amplitude, a braking portion that causes, at a second time, the linear resonant actuator to oscillate with the acceleration having a second amplitude. The second amplitude can be a specific percentage of the first amplitude. The second time can be after the first time. With respect to the resonant frequency, the second time can be out of phase (e.g., an odd multiple of 90 degrees out of phase) with the first time. In this manner, the braking portion of the waveform of the driving voltage signal can act to reduce a duration of time between the start time and the stop time.

Because: (1) friction within the linear resonant actuator can have already dampened, by the second time, the motion of the linear resonant actuator such that an amplitude of the acceleration of the linear resonant actuator at the second time is already less than an amplitude of the acceleration of the linear resonator actuator at the first time and (2) the quality factor of the linear resonator actuator can characterize the measure of the rate of damping of the linear resonant actuator, an amplitude of the braking portion of the waveform of the driving voltage signal can be determined from the quality factor.

Figure 3:
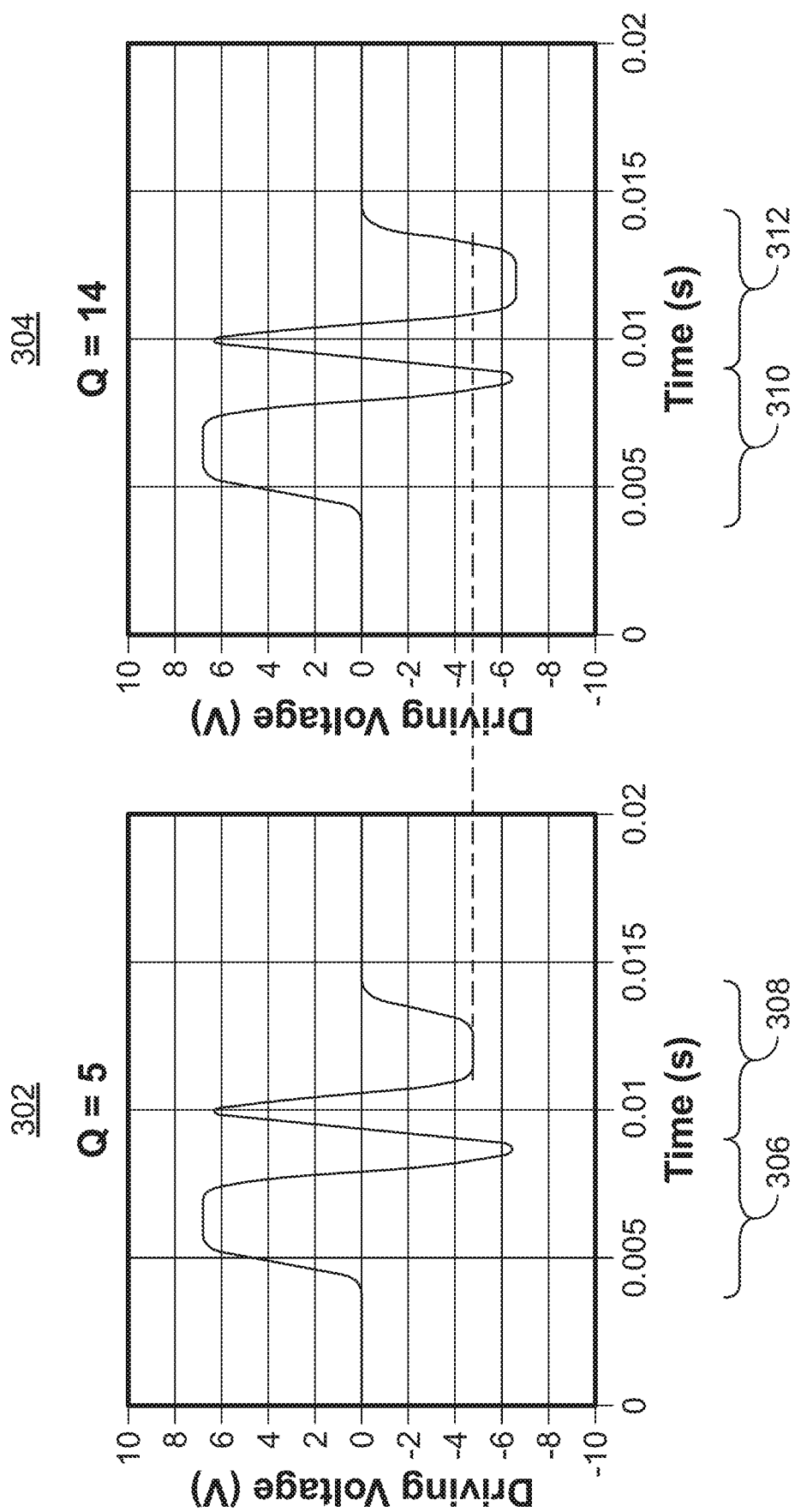
FIG. 3 illustrates waveforms of driving voltage signals for two exemplary linear resonant actuators, according to the disclosed technologies.

FIG. 3 illustrates waveforms of driving voltage signals 302 and 304 for two exemplary linear resonant actuators, according to the disclosed technologies.

The waveform of the driving voltage signal 302 can be for an exemplary linear resonator having a quality factor of five. The waveform of the driving voltage signal 302 can include a driving portion 306 and a braking portion 308. The driving portion 306 can include, for example, about fifty percent of a duration of time of the waveform of the driving voltage signal 302, and the braking portion 308 can include about fifty percent of the duration of time of the waveform of the driving voltage signal 302. The duration of time of each of the driving portion 306 and the braking portion 308 can be, for example, seventy-five percent of a duration of time of a resonant period (i.e., an inverse of the resonant frequency) of the exemplary linear resonator having the quality factor of five. That is, if a start time of the driving portion 306 corresponds to a start time of the resonant period (i.e., phase of 0 degrees) of the exemplary linear resonator having the quality factor of five, then an end time of the driving portion 306 (i.e., a start time of the braking portion 308) can correspond to a time that is seventy-five percent of the resonant period (i.e., phase of 270 degrees) of the exemplary linear resonator having the quality factor of five.

The waveform of the driving voltage signal 304 can be for an exemplary linear resonant actuator having a quality factor of fourteen. The waveform of the driving voltage signal 304 can include a driving portion 310 and a braking portion 312. The driving portion 310 can include, for example, about fifty percent of a duration of time of the waveform of the driving voltage signal 304, and the braking portion 312 can include about fifty percent of the duration of time of the waveform of the driving voltage signal 304. The duration of time of each of the driving portion 310 and the braking portion 312 can be, for example, seventy-five percent of a duration of time of a resonant period (i.e., an inverse of the resonant frequency) of the exemplary linear resonator having the quality factor of fourteen. That is, if a start time of the driving portion 310 corresponds to a start time of the resonant period (i.e., phase of 0°) of the exemplary linear resonator having the quality factor of fourteen, then an end time of the driving portion 310 (i.e., a start time of the braking portion 312) can correspond to a time that is seventy-five percent of the resonant period (i.e., phase of 270°) of the exemplary linear resonator having the quality factor of five.

As illustrated in FIG. 3, an amplitude of the braking portion 312 can be larger than an amplitude of the braking portion 308.

Figure 4:
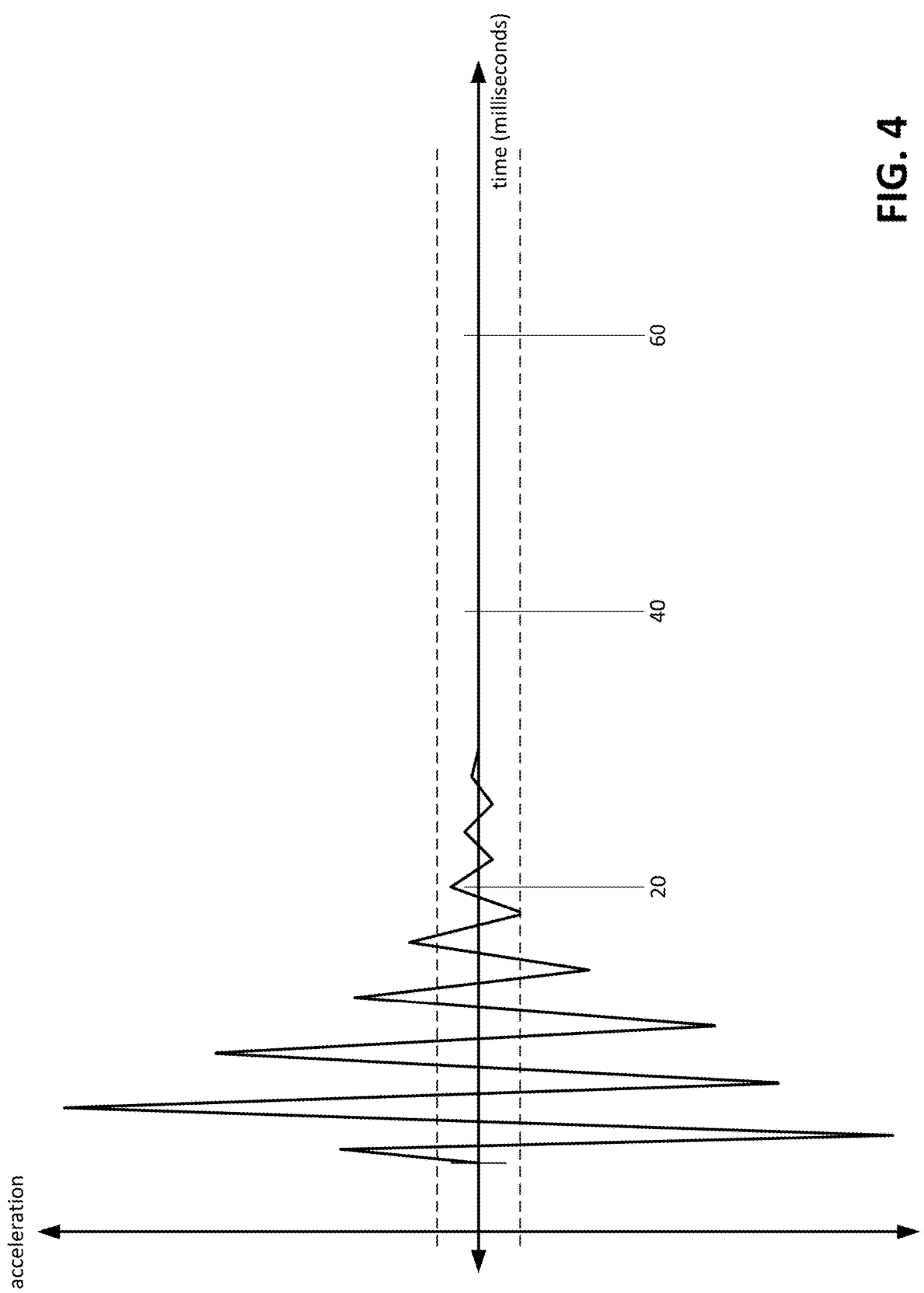
FIG. 4 illustrates a graph of acceleration versus time in response to a driving voltage signal, having a waveform with a driving portion and a braking portion, applied to an exemplary linear resonant actuator, according to the disclosed technologies.

FIG. 4 illustrates a graph of acceleration versus time in response to a driving voltage signal, having a waveform with a driving portion and a braking portion, applied to an exemplary linear resonant actuator, according to the disclosed technologies. As illustrated in FIG. 4, for example, the stop time of the exemplary linear resonant actuator can be less than 20 milliseconds.

Unfortunately, because of process variation and other factors associated with the manufacture of linear resonant actuators and electronic devices, the quality factor can vary from one unit to another unit even when both units are the same model of linear resonant actuator. Thus, there is a need for a method to determine, for each individual linear resonant actuator, the quality factor of that linear resonant actuator so that an appropriate amplitude of the braking port of the waveform of the driving voltage signal can be determined.

The disclosed technologies can determine an amplitude of a braking portion of a waveform of a driving voltage signal for a linear resonant actuator. A measure of a characteristic of the linear resonant actuator can be obtained. The characteristic can be different from a quality factor of the linear resonant actuator. The quality factor can be determined based on the measure of the characteristic. The amplitude of the braking portion of the waveform of the driving voltage signal can be determined based on the quality factor. Data for a driving voltage signal circuitry can be set, based on the amplitude, to cause the driving voltage circuitry to produce the driving voltage signal. The driving voltage signal can have (e.g., define) the waveform in which the braking portion has the amplitude.

For example, the waveform of the driving voltage signal can include a driving portion and a braking portion. The braking portion can occur after the driving portion. The braking portion can cause the linear resonant actuator to oscillate with an acceleration having an amplitude that is less than the amplitude of the acceleration of the oscillation caused by the driving portion without a subsequent braking portion. In particular, an occurrence of the braking portion in the driving voltage signal can cause a reduction in the amplitude of the acceleration of the oscillation of the linear resonant actuator (for points in time after the braking portion has been applied to the linear resonant actuator). Having the braking portion in the driving voltage signal can lead to an additional damping of the linear resonator actuator. A measure of a rate of damping of the linear resonator actuator can be characterized by the quality factor of the linear resonant actuator. The quality factor of the linear resonant actuator can be determined from a characteristic of the linear resonant actuator. The characteristic can be different from the quality factor. For example, a measure of the characteristic can be obtained from the voltage and/or current as a function of a time in response to a signal applied to the linear resonant actuator. More particularly, the measure of the characteristic can be obtained by obtaining a measure of a voltage as a function of a time in response to a (sinusoidal) chirp signal applied to the linear resonant actuator and by obtaining a measure of a current as a function of the time in response to the (sinusoidal) chirp signal applied to the linear resonant actuator.

Figure 5:
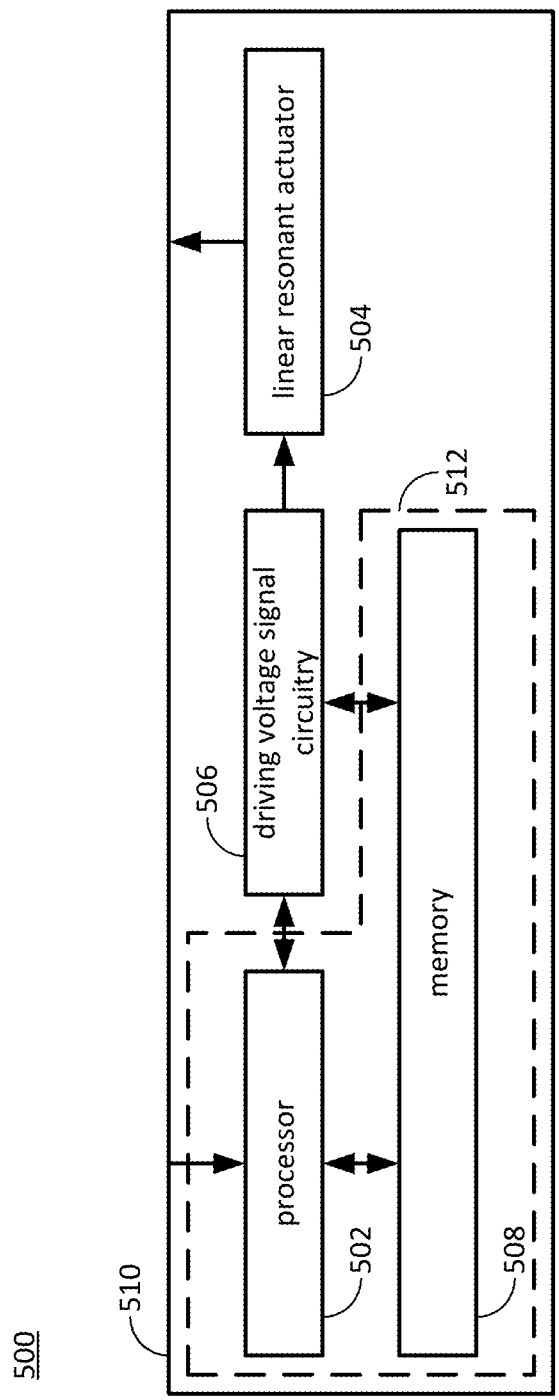
FIG. 5 is a block diagram of an example of an electronic device, according to the disclosed technologies.

FIG. 5 is a block diagram of an example of an electronic device 500, according to the disclosed technologies. The electronic device 500 can include, for example, a processor 502, a linear resonator actuator 504, a driving voltage signal circuitry 506, a memory 508, and a housing 510. The electronic device 500 can include a system 512 for determining an amplitude of a braking portion of a waveform of a driving voltage signal for the linear resonant actuator 504. The system 512 can include, for example, the processor 502 and the memory 508. The electronic device 500 can be a smartphone, a wearable technology product, or the like.

The processor 502 can be configured to obtain a measure of a characteristic of the linear resonant actuator 504. The characteristic can be different from a quality factor of the linear resonant actuator 504.

For example, the processor 502 can be configured to obtain the measure of the characteristic of the linear resonant actuator 504 according to a first optional implementation of the disclosed technologies. In the first optional implementation, the processor 502 can be configured to obtain a measure of a voltage as a function of a time in response to a sinusoidal chirp signal applied to the linear resonant actuator 504. In the first optional implementation, the processor 402 can be configured to obtain a measure of a current as a function of the time in response to the sinusoidal chirp signal applied to the linear resonant actuator 504.

Alternatively or additionally, for example, the processor 502 can be configured to obtain the measure of the characteristic of the linear resonant actuator 504 according to a second optional implementation of the disclosed technologies. In the second optional implementation, the processor 502 can be configured to determine a difference between two adjacent maximum amplitudes of an acceleration of an oscillation of the linear resonant actuator 504 in response to a pulse signal applied to the linear resonant actuator 504. The pulse signal can be at a resonant frequency of the linear resonant actuator 504. For example, with reference to FIGS. 1 and 5, the processor 502 can be configured to determine the difference ($\Delta A$) between the two adjacent maximum amplitudes ($A_1$ and $A_2$) of the acceleration of the oscillation of the linear resonant actuator 504 in response to the pulse signal applied to the linear resonant actuator 504. In the second optional implementation, the processor 502 can be configured to determine a duration of time between a larger maximum amplitude, of the two adjacent maximum amplitudes, and a smaller maximum amplitude of the two adjacent maximum amplitudes. For example, with reference to FIGS. 1 and 5, the processor 502 can be configured to determine the duration of time ($\Delta t$) between the larger maximum amplitude ($A_1$), of the two adjacent maximum amplitudes, and the smaller maximum amplitude ($A_2$) of the two adjacent maximum amplitudes.

The processor 502 can be configured to determine, based on the measure of the characteristic, the quality factor.

For example, in the first optional implementation, the processor 502 can be configured to determine the quality factor by performing a first set of operations.

In the first set of operations, the processor 502 can be configured to determine an impedance as a function of a frequency in response to the sinusoidal chirp signal applied to the linear resonant actuator 504. For example, the processor 502 can be configured to determine, from the voltage as the function of the time, a voltage as a function of the frequency. For example, the processor 502 can be configured to determine, from the current as the function of the time, a current as a function of the frequency. For example, the processor 502 can be configured to determine, from the voltage as the function of the frequency and from the current as the function of the frequency, the impedance as the function of the frequency.

In the first set of operations, the processor 502 can be configured to determine, from the impedance as the function of the frequency, a maximum impedance and a first frequency. The first frequency can be a frequency of the maximum impedance.

In the first set of operations, the processor 502 can be configured to obtain a resistance of the linear resonator actuator 504.

For example, the processor 502 can be configured to read, from the memory 508, a value of the resistance. (For example, the value of the resistance can have been stored in the memory 508 in conjunction with operations to manufacture the electronic device 500.)

Alternatively or additionally, for example, the processor 502 can be configured to obtain the resistance by performing a second set of operations. In the second set of operations, the processor 502 can be configured to obtain a measure of a voltage as a function of a time in response to a pilot tone applied to the linear resonant actuator 504. In the second set of operations, the processor 502 can be configured to obtain a measure of a current as a function of the time in response to the pilot tone applied to the linear resonant actuator 504. In the second set of operations, the processor 502 can be configured to determine a fast Fourier transform of the voltage as the function of the time in response to the pilot tone. In the second set of operations, the processor 502 can be configured to determine a fast Fourier transform of the current as the function of the time in response to the pilot tone. In the second set of operations, the processor 502 can be configured to determine a quotient of the fast Fourier transform of the voltage as the function of the time in response to the pilot tone divided by the fast Fourier transform of the current as the function of the time in response to the pilot tone. In the second set of operations, the processor 502 can be configured to determine a real part of the quotient. The real part of the quotient can be the resistance of the linear resonant actuator 504.

In the first set of operations, the processor 502 can be configured to determine, from the impedance as the function of the frequency, from the maximum impedance, and from the resistance, an impedance associated with the quality factor, a second frequency, and a third frequency. For example, the processor 502 can be configured to determine a square root of a product. The product can be of the maximum impedance multiplied by the resistance. The square root can be the impedance associated with the quality factor. The second frequency can be a lower frequency of the impedance associated with the quality factor. The second frequency can be less than the first frequency. The third frequency can be a higher frequency of the impedance associated with the quality factor. The third frequency can being greater than the first frequency.

In the first set of operations, the processor 502 can be configured to determine, from the first frequency, the second frequency, the third frequency, the maximum impedance, and the resistance, the quality factor. For example, the processor 502 can be configured to determine a product of a first quotient multiplied by a square root. The first quotient can be the first frequency divided by a difference. The difference can be the second frequency subtracted from the first frequency. The square root can be of a second quotient. The second quotient can be the maximum impedance divided by the resistance. The product can be the quality factor.

Additionally or alternatively, in the second optional implementation, the processor 502 can be configured to determine an inverse of a first quotient to determine the quality factor. The first quotient can be of a product divided by a second quotient. The product can be of the resonant frequency multiplied by pi. The second quotient can be of a natural log of a third quotient divided by the duration of time (e.g., $\Delta t$). The third quotient can be of the smaller maximum amplitude (e.g., $A_2$) divided by the larger maximum amplitude (e.g., $A_1$).

The processor 502 can be configured to determine, based on the quality factor, the amplitude of the braking portion of the waveform of the driving voltage signal. For example, the processor 502 can be configured to determine the amplitude as a function of the quality factor. Optionally, the function can be determined. For example, the function can be determined by performing a third set of operations. In the third set of operations, a corresponding quality factor can be determined for each member of a set of linear resonant actuators. (For example, each member of the set of linear resonant actuators can be the same model of linear resonant actuator.) In the third set of operations, a corresponding amplitude of a corresponding braking portion of a corresponding waveform of a corresponding driving voltage signal to cause a corresponding linear resonator actuator to oscillate with an acceleration having an amplitude that is less than or equal to a specific percentage of an amplitude of an acceleration of an oscillation of the corresponding linear resonator actuator caused by a corresponding driving portion of the corresponding waveform of the corresponding driving voltage signal can be determined for each member of the set of linear resonator actuators. In the third set of operations, a line associated with a plot of amplitudes of braking portions of waveforms of driving voltage signals of the linear resonant actuators versus quality factors of the linear resonant actuators can be determined. The line can be a linear least squares fit of the plot. In the third set of operations, the function can be determined based on the line. The function can include a slope and an intercept. The slope can be a measure of a number of units of change of the amplitude per a single unit of change of the quality factor. The intercept can being a value of the amplitude at a quality factor of zero.

The processor 502 can be configured to set, based on the amplitude, data for the driving voltage signal circuitry 506 to cause the driving voltage circuitry 506 to produce the driving voltage signal. The driving voltage signal can have (e.g., define) the waveform in which the braking portion has the amplitude.

For example, with reference to FIG. 3, the waveform of the driving voltage signal 302 or 304 can include, for example, the driving portion 306 or 310 and the braking portion 308 or 312. For example, the driving portion 306 or 310 can include about fifty percent of a duration of time of the waveform, and the braking portion 308 or 312 can include about fifty percent of the duration of time of the waveform. The driving portion 306 or 310 can cause the linear resonant actuator 504 to oscillate with an acceleration having a first amplitude at a first time. The braking portion 308 or 312 can cause the linear resonant actuator 504 to oscillate with the acceleration having a second amplitude at a second time. The second amplitude can be a percentage of the first amplitude. For example, the percentage can be less than or equal to ten percent. The second time can be after the first time. For example, a duration of time between the second time and the first time can be a function of a use of the linear resonant actuator 504. For example, the duration of time between the second time and the first time can be less than or equal to twenty milliseconds.

For example, the processor 504 can be configured to obtain the measure of the characteristic, to determine the quality factor, to determine the amplitude of the braking portion of the waveform of the driving voltage signal, and to set the data for the driving voltage signal circuitry prior to packaging a product (e.g., the electronic device 500) that includes the linear resonant actuator 504 (e.g., in conjunction with tests performed on the product after the product has been manufactured, but before the product has been packaged for sale).

Additionally or alternatively, for example, the processor 504 can be configured to obtain the measure of the characteristic, to determine the quality factor, to determine the amplitude of the braking portion of the waveform of the driving voltage signal, and to set the data for the driving voltage signal circuitry in response to an event associated with a product (e.g., the electronic device 500) that includes the linear resonant actuator 504. The event can have a physical or a technical character (e.g., a physical event). For example, the event can include one or more of a mechanical shock to the product, a charging of a power supply of the product, a duration of time associated with a lack of a particular activity associated with the product, or the like. For example, the duration of time can be greater than five minutes. For example, the particular activity can be one or more of a motion of the product, an input signal from a user of the product, or the like. Optionally, the processor 504 can be further configured to receive, from an accelerometer (not illustrated), a signal that indicates the lack of the motion of the product. The processor 504 can be configured to obtain the measure of the characteristic, to determine the quality factor, to determine the amplitude of the braking portion of the waveform of the driving voltage signal, and to set the data for the driving voltage signal circuitry in response to a receipt of the signal.

Figure 6:
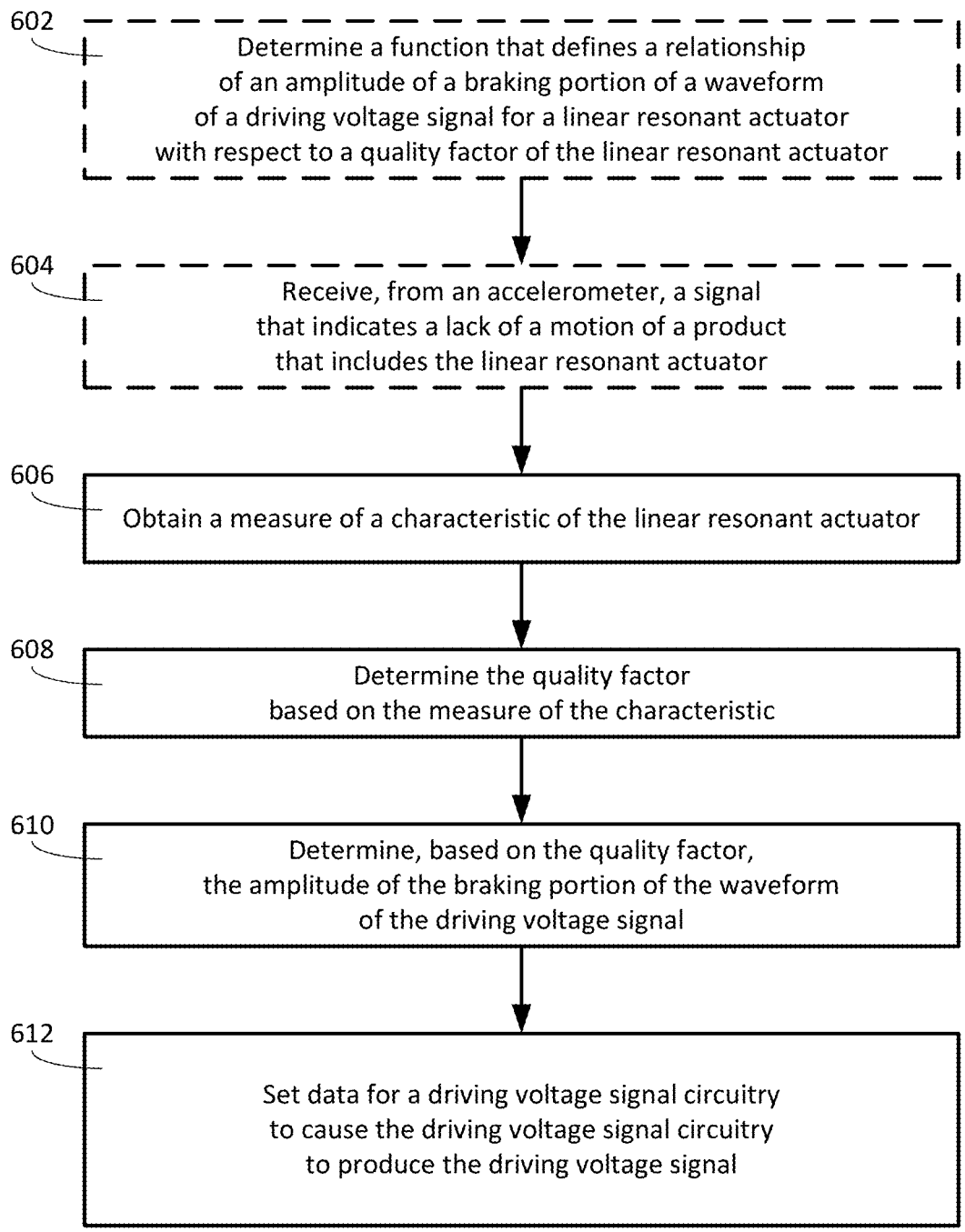
FIG. 6 is a flow diagram of an example of a method for determining an amplitude of a braking portion of a waveform of a driving voltage signal for a linear resonant actuator, according to the disclosed technologies.

FIG. 6 is a flow diagram of an example of a method 600 for determining an amplitude of a braking portion of a waveform of a driving voltage signal for a linear resonant actuator, according to the disclosed technologies.

In the method 600, at an optional operation 602, a function can be determined. The function can define a relationship of the amplitude of the braking portion of the waveform of the driving voltage signal with respect to a quality factor of the linear resonant actuator.

FIG. 7 is a flow diagram of an example of a method 602 for determining, based on the quality factor of the linear resonant actuator, the amplitude of the braking portion of the waveform of the driving voltage signal.

In the method 602, at an operation 702, a corresponding quality factor can be determined for each member of a set of linear resonant actuators. (For example, each member of the set of linear resonant actuators can be the same model of linear resonant actuator.)

At an operation 704, a corresponding amplitude of a corresponding braking portion of a corresponding waveform of a corresponding driving voltage signal to cause a corresponding linear resonator actuator to oscillate with an acceleration having an amplitude that is less than or equal to a specific percentage of an amplitude of an acceleration of an oscillation of the corresponding linear resonator actuator caused by a corresponding driving portion of the corresponding waveform of the corresponding driving voltage signal can be determined for each member of the set of linear resonator actuators.

At an operation 706, a line associated with a plot of amplitudes of braking portions of waveforms of driving voltage signals of the linear resonant actuators versus quality factors of the linear resonant actuators can be determined. The line can be a linear least squares fit of the plot.

At an operation 708, the function can be determined based on the line. The function can include a slope and an intercept. The slope can be a measure of a number of units of change of the amplitude per a single unit of change of the quality factor. The intercept can being a value of the amplitude at a quality factor of zero.

Returning to FIG. 6, in the method 600, at an optional operation 604, a signal that indicates a lack of a motion of a product that includes the linear resonant actuator can be received from an accelerometer.

At an operation 606, a measure of a characteristic of the linear resonant actuator can be obtained. The characteristic can be different from the quality factor of the linear resonant actuator.

FIG. 8 is a flow diagram of an example of a first method 606A for obtaining the measure of the characteristic of the linear resonant actuator, according to the disclosed technologies.

In the method 606A, at an operation 802, a measure of a voltage as a function of a time in response to a sinusoidal chirp signal applied to the linear resonant actuator can be obtained.

At an operation 804, a measure of a current as a function of the time in response to the sinusoidal chirp signal applied to the linear resonant actuator can be obtained.

FIG. 9 is a flow diagram of an example of a second method 606B for obtaining the measure of the characteristic of the linear resonant actuator, according to the disclosed technologies.

In the method 606B, at an operation 902, a difference between two adjacent maximum amplitudes of an acceleration of an oscillation of the linear resonant actuator in response to a pulse signal applied to the linear resonant actuator can be determined. The pulse signal can be at a resonant frequency of the linear resonant actuator.

At an operation 904, a duration of time between a larger maximum amplitude, of the two adjacent maximum amplitudes, and a smaller maximum amplitude of the two adjacent maximum amplitudes can be determined.

Returning to FIG. 6, in the method 600, at an operation 608, the quality factor can be determined based on the measure of the characteristic.

FIG. 10 is a flow diagram of an example of a first method 608 for determining the quality factor based on the measure of the characteristic, according to the disclosed technologies.

In the method 608, at an operation 1002, an impedance as a function of a frequency can be determined in response to the sinusoidal chirp signal applied to the linear resonant actuator.

FIG. 11 is a flow diagram of an example of a method 1002 for determining the impedance as the function of the frequency, according to the disclosed technologies.

In the method 1002, at an operation 1102, a voltage as a function of the frequency can be determined from the voltage as the function of the time.

At an operation 1104, a current as a function of the frequency can be determined from the current as the function of the time.

At an operation 1106, the impedance as the function of the frequency can be determined from the voltage as the function of the frequency and from the current as the function of the frequency.

Returning to FIG. 10, in the method 608, at an operation 1004, a maximum impedance and a first frequency can be determined from the impedance as the function of the frequency. The first frequency can be a frequency of the maximum impedance.

At an operation 1006, a resistance of the linear resonator actuator can be obtained.

For example, a value of the resistance can be read from a memory of a product that includes the linear resonant actuator. (For example, the value of the resistance can have been stored in the memory in conjunction with operations to manufacture the product.)

FIG. 12 is a flow diagram of an alternative or additional example of a method 1006 for obtaining the resistance of the linear resonant actuator, according to the disclosed technologies.

In the method 1006, at an operation 1202, a measure of a voltage as a function of a time in response to a pilot tone applied to the linear resonant actuator can be obtained.

At an operation 1204, a measure of a current as a function of the time in response to the pilot tone applied to the linear resonant actuator can be obtained.

At an operation 1206, a fast Fourier transform of the voltage as the function of the time in response to the pilot tone can be determined.

At an operation 1208, a fast Fourier transform of the current as the function of the time in response to the pilot tone can be determined.

At an operation 1210, a quotient of the fast Fourier transform of the voltage as the function of the time in response to the pilot tone divided by the fast Fourier transform of the current as the function of the time in response to the pilot tone can be determined.

At an operation 1212, a real part of the quotient can be determined. The real part of the quotient can be the resistance of the linear resonant actuator.

Returning to FIG. 10, in the method 608, at an operation 1008, an impedance associated with the quality factor, a second frequency, and a third frequency can be determined from the impedance as the function of the frequency, from the maximum impedance, and from the resistance. For example, a square root of a product can be determined. The product can be of the maximum impedance multiplied by the resistance. The square root can be the impedance associated with the quality factor. The second frequency can be a lower frequency of the impedance associated with the quality factor. The second frequency can be less than the first frequency. The third frequency can be a higher frequency of the impedance associated with the quality factor. The third frequency can being greater than the first frequency.

At an operation 1010, the quality factor can be determined from the first frequency, the second frequency, the third frequency, the maximum impedance, and the resistance. For example, a product of a first quotient multiplied by a square root can be determined. The first quotient can be the first frequency divided by a difference. The difference can be the second frequency subtracted from the first frequency. The square root can be of a second quotient. The second quotient can be the maximum impedance divided by the resistance. The product can be the quality factor.

Additionally or alternatively, the quality factor can be determined, based on the measure of the characteristic, according to a second method. In the second method, the quality factor can be determined to be an inverse of a first quotient. The first quotient can be of a product divided by a second quotient. The product can be of the resonant frequency multiplied by pi. The second quotient can be of a natural log of a third quotient divided by the duration of time. The third quotient can be of the smaller maximum amplitude divided by the larger maximum amplitude. The smaller maximum amplitude (e.g., $A_2$) and the larger maximum amplitude (e.g., $A_1$) can be the two adjacent maximum amplitudes of the acceleration of the oscillation of the linear resonant actuator in response to the pulse signal applied to the linear resonant actuator associated with the operation 902. The duration of time (e.g., $\Delta t$) can be determined at the operation 904.

Returning to FIG. 6, in the method 600, at an operation 610, the amplitude of the braking portion of the waveform of the driving voltage signal can be determined based on the quality factor. For example, the amplitude can be determined as a function of the quality factor. For example, the function can be determined at the optional operation 602.

At an operation 612, data for a driving voltage signal circuitry can be set to cause the driving voltage circuitry to produce the driving voltage signal. The driving voltage signal can have (e.g., define) the waveform in which the braking portion has the amplitude.

For example, the waveform of the driving voltage signal can include a driving portion and the braking portion. For example, the driving portion can include about fifty percent of a duration of time of the waveform and the braking portion can include about fifty percent of the duration of time of the waveform. The driving portion can cause the linear resonant actuator to oscillate with an acceleration having a first amplitude at a first time. The braking portion can cause the linear resonant actuator to oscillate with the acceleration having a second amplitude at a second time. The second amplitude can be a percentage of the first amplitude. For example, the percentage can be less than or equal to ten percent. The second time can be after the first time. For example, a duration of time between the second time and the first time can be a function of a use of the linear resonant actuator. For example, the duration of time between the second time and the first time can be less than or equal to twenty milliseconds.

For example, the operations 606, 608, 610, and 612 can be performed prior to packaging a product that includes the linear resonant actuator (e.g., in conjunction with tests performed on the product after the product has been manufactured, but before the product has been packaged for sale).

Additionally or alternatively, for example, the operations 606, 608, 610, and 612 can be performed in response to an event associated with a product includes the linear resonant actuator. The event can have a physical or a technical character (e.g., a physical event). For example, the event can include one or more of a mechanical shock to the product, a charging of a power supply of the product, a duration of time associated with a lack of a particular activity associated with the product, or the like. For example, the duration of time can be greater than five minutes. For example, the particular activity can be one or more of a motion of the product, an input signal from a user of the product, or the like. For example, the signal that indicates the lack of the motion of the product that includes the linear resonant actuator can be received from the accelerometer at the optional operation 604. The operations 606, 608, 610, and 612 can be performed in response to a receipt of the signal.

Figure 13:
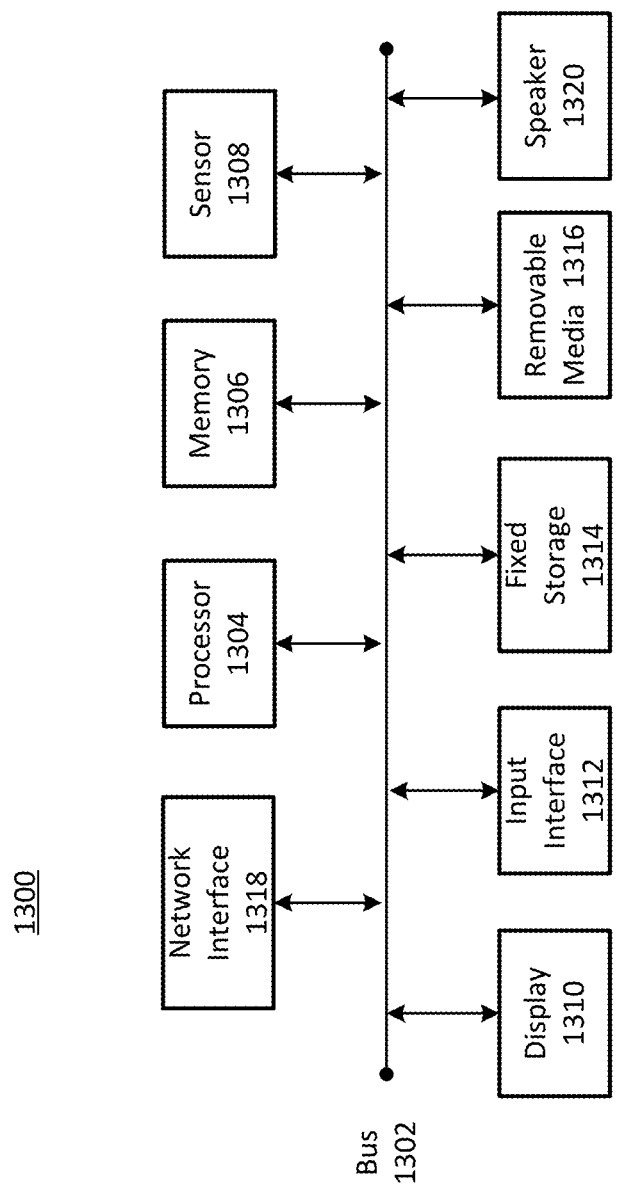
FIG. 13 is a block diagram of an example of a computing device suitable for implementing certain devices.

FIG. 13 is a block diagram of an example of a computing device 1300 suitable for implementing certain devices. The computing device 1300 can be used to implement, for example, the electronic device 500 as described above The computing device 1300 can include a bus 1302 that interconnects major components of the computing device 1300. Such components can include a central processor 1304; a memory 1306 (such as Random Access Memory (RAM), Read-Only Memory (ROM), flash RAM, or the like), a sensor 1308 (which can include one or more sensors), a display 1310 (such as a display screen), an input interface 1312 (which can include one or more input devices such as a keyboard, mouse, keypad, touch pad, turn-wheel, and the like), a fixed storage 1314 (such as a hard drive, flash storage, and the like), a removable media component 1316 (operable to control and receive a solid-state memory device, an optical disk, a flash drive, and the like), a network interface 1318 (operable to communicate with one or more remote devices via a suitable network connection), and a speaker 1320 (to output an audible communication). In some embodiments the input interface 1312 and the display 1310 can be combined, such as in the form of a touchscreen.

The bus 1302 can allow data communication between the central processor 1304 and one or more memory components 1314, 1316, which can include RAM, ROM, or other memory. Applications resident with the computing device 1300 generally can be stored on and accessed via a computer readable storage medium.

The fixed storage 1314 can be integral with the computing device 1300 or can be separate and accessed through other interfaces. The network interface 1318 can provide a direct connection to the premises management system and/or a remote server via a wired or wireless connection. The network interface 1318 can provide such connection using any suitable technique and protocol, including digital cellular telephone, WiFi™, Thread®, Bluetooth®, near field communications (NFC), and the like. For example, the network interface 1318 can allow the computing device 1300 to communicate with other components of the premises management system or other computers via one or more local, wide-area, or other communication networks.

The foregoing description, for purpose of explanation, has been described with reference to specific configurations. However, the illustrative discussions above are not intended to be exhaustive or to limit configurations of the disclosed technologies to the precise forms disclosed. Many modifications and variations are possible in view of the above teachings. The configurations were chosen and described in order to explain the principles of the disclosed technologies and their practical applications, to thereby enable others skilled in the art to utilize those configurations as well as various configurations with various modifications as may be suited to the particular use contemplated.

The invention claimed is:

1. A method for determining an amplitude of a braking portion of a waveform of a driving voltage signal for a linear resonant actuator, the method comprising:
    obtaining, by a processor, a measure of a characteristic of the linear resonant actuator, the characteristic being different from a quality factor of the linear resonant actuator, wherein obtaining the measure of the characteristic comprises one or both of:
        obtaining a measure of a voltage as a function of a time in response to a sinusoidal chirp signal applied to the linear resonant actuator; and
        obtaining a measure of a current as a function of the time in response to the sinusoidal chirp signal applied to the linear resonant actuator;
    determining, by the processor and based on the measure of the characteristic, the quality factor;
    determining, by the processor and based on the quality factor, the amplitude of the braking portion of the waveform of the driving voltage signal; and
    setting, by the processor and based on the amplitude, data for a driving voltage signal circuitry to cause the driving voltage signal circuitry to produce the driving voltage signal, the driving voltage signal having the waveform in which the braking portion has the amplitude.

2. The method of claim 1, wherein the waveform of the driving voltage signal comprises:
    a driving portion that causes the linear resonant actuator to oscillate with an acceleration having a first amplitude at a first time; and
    the braking portion that causes the linear resonant actuator to oscillate with the acceleration having a second amplitude at a second time, the second amplitude being a percentage of the first amplitude, the second time being after the first time.

3. The method of claim 2, wherein the percentage is less than or equal to ten percent.

4. The method of claim 2, wherein a duration of time between the second time and the first time is a function of a use of the linear resonant actuator.

5. The method of claim 2, wherein a duration of time between the second time and the first time is less than or equal to twenty milliseconds.

6. The method of claim 2, wherein:
    the driving portion comprises fifty percent of a duration of time of the waveform; and
    the braking portion comprises fifty percent of the duration of time of the waveform.

7. The method of claim 1, wherein the method is performed prior to packaging a product that includes the linear resonant actuator.

8. The method of claim 1, wherein the method is performed in response to an event associated with a product that includes the linear resonant actuator.

9. The method of claim 8, wherein the event comprises at least one of a mechanical shock to the product, a charging of a power supply of the product, or a duration of time associated with a lack of a particular activity associated with the product, the duration of time being greater than five minutes, the particular activity being at least one of a motion of the product or an input signal from a user of the product.

10. The method of claim 9, further comprising receiving, by the processor and from an accelerometer, a signal that indicates the lack of the motion of the product, wherein the obtaining the measure of the characteristic, the determining the quality factor, the determining the amplitude, and the setting are performed in response to a receipt of the signal.

11. The method of claim 1, wherein the determining the quality factor comprises:
    determining an impedance as a function of a frequency in response to the sinusoidal chirp signal applied to the linear resonant actuator;
    determining, from the impedance as the function of the frequency, a maximum impedance and a first frequency, the first frequency being a frequency of the maximum impedance;
    obtaining a resistance of the linear resonator actuator;
    determining, from the impedance as the function of the frequency, from the maximum impedance, and from the resistance, an impedance associated with the quality factor, a second frequency, and a third frequency, the second frequency being a lower frequency of the impedance associated with the quality factor, the second frequency being less than the first frequency, the third frequency being a higher frequency of the impedance associated with the quality factor, the third frequency being greater than the first frequency; and
    determining, from the first frequency, the second frequency, the third frequency, the maximum impedance, and the resistance, the quality factor.

12. The method of claim 11, wherein the determining the impedance as the function of the frequency comprises:
    determining, from the voltage as the function of the time, a voltage as a function of the frequency;
    determining, from the current as the function of the time, a current as a function of the frequency; and determining, from the voltage as the function of the frequency and from the current as the function of the frequency, the impedance as the function of the frequency.

13. The method of claim 11, wherein the obtaining the resistance comprises reading, from a memory, a value of the resistance.

14. The method of claim 11, wherein the obtaining the resistance comprises:
   obtaining a measure of a voltage as a function of a time in response to a pilot tone applied to the linear resonant actuator;
   obtaining a measure of a current as a function of the time in response to the pilot tone applied to the linear resonant actuator;
   determining a fast Fourier transform of the voltage as the function of the time in response to the pilot tone;
   determining a fast Fourier transform of the current as the function of the time in response to the pilot tone;
   determining a quotient of the fast Fourier transform of the voltage as the function of the time in response to the pilot tone divided by the fast Fourier transform of the current as the function of the time in response to the pilot tone; and
   determining a real part of the quotient.

15. The method of claim 11, wherein the determining the impedance associated with the quality factor comprises determining a square root of a product, the product being of the maximum impedance multiplied by the resistance.

16. The method of claim 11, wherein the determining the quality factor comprises determining a product of a first quotient multiplied by a square root, the first quotient being the first frequency divided by a difference, the difference being the second frequency subtracted from the first frequency, the square root being of a second quotient, the second quotient being the maximum impedance divided by the resistance.

17. The method of claim 1, wherein the obtaining the measure of the characteristic further comprises:
   determining a difference between two adjacent maximum amplitudes of an acceleration of an oscillation of the linear resonant actuator in response to a pulse signal applied to the linear resonant actuator, the pulse signal being at a resonant frequency of the linear resonant actuator; and
   determining a duration of time between a larger maximum amplitude, of the two adjacent maximum amplitudes, and a smaller maximum amplitude of the two adjacent maximum amplitudes.

18. The method of claim 17, wherein the determining the quality factor comprises determining an inverse of a first quotient, the first quotient being of a product divided by a second quotient, the product being of the resonant frequency multiplied by pi, the second quotient being of a natural log of a third quotient divided by the duration of time, the third quotient being of the smaller maximum amplitude divided by the larger maximum amplitude.

19. The method of claim 1, wherein the determining the amplitude comprises determining the amplitude as a function of the quality factor.

20. The method of claim 19, further comprising determining the function.

21. The method of claim 20, wherein the determining the function comprises:
   determining, for each member of a set of linear resonant actuators, a corresponding quality factor;
   determining, for the each member of the set of linear resonator actuators, a corresponding amplitude of a corresponding braking portion of a corresponding waveform of a corresponding driving voltage signal to cause a corresponding linear resonator actuator to oscillate with an acceleration having an amplitude that is less than or equal to a specific percentage of an amplitude of an acceleration of an oscillation of the corresponding linear resonator actuator caused by a corresponding driving portion of the corresponding waveform of the corresponding driving voltage signal;
   determining a line associated with a plot of amplitudes of braking portions of waveforms of driving voltage signals of the linear resonant actuators versus quality factors of the linear resonant actuators, the line being a linear least squares fit of the plot; and
determining, based on the line, the function, the function including a slope and an intercept, the slope being a measure of a number of units of change of the amplitude per a single unit of change of the quality factor, the intercept being a value of the amplitude at a quality factor of zero.

22. A non-transitory computer-readable medium storing computer code for controlling a processor to cause the processor to determine an amplitude of a braking portion of a waveform of a driving voltage signal for a linear resonant actuator determining an amplitude of a braking portion of a waveform of a driving voltage signal for a linear resonant actuator, the computer code including instructions to cause the processor to:
   obtain a measure of a characteristic of the linear resonant actuator, the characteristic being different from a quality factor of the linear resonant actuator, wherein the instructions that cause the processor to obtain the measure of the characteristic comprise one or both of instructions that cause the processor to:
      obtain a measure of a voltage as a function of a time in response to a sinusoidal chirp signal applied to the linear resonant actuator; and
      obtain a measure of a current as a function of the time in response to the sinusoidal chirp signal applied to the linear resonant actuator;
   determine, based on the measure of the characteristic, the quality factor;
   determine, based on the quality factor, the amplitude of the braking portion of the waveform of the driving voltage signal; and
   set, based on the amplitude, data for a driving voltage signal circuitry to cause the driving voltage signal circuitry to produce the driving voltage signal, the driving voltage signal having the waveform in which the braking portion has the amplitude.

23. A system for determining an amplitude of a braking portion of a waveform of a driving voltage signal for a linear resonant actuator, the system comprising:
   a memory configured to store a measure of a characteristic of the linear resonant actuator and data for a driving voltage signal circuitry; and
   a processor configured to:
      obtain the measure of the characteristic of the linear resonant actuator, the characteristic being different from a quality factor of the linear resonant actuator, wherein, to obtain the measure of the characteristic, the processor is configured to one or both of:
         obtain a measure of a voltage as a function of a time in response to a sinusoidal chirp signal applied to the linear resonant actuator; and obtain a measure of a current as a function of the time in response to the sinusoidal chirp signal applied to the linear resonant actuator;

determine, based on the measure of the characteristic, the quality factor;

determine, based on the quality factor, the amplitude of the braking portion of the waveform of the driving voltage signal; and set, based on the amplitude, the data for the driving voltage signal circuitry to cause the driving voltage signal circuitry to produce the driving voltage signal, the driving voltage signal having the waveform in which the braking portion has the amplitude.

24. The system of claim 23, wherein the system is included in a smartphone.

25. The system of claim 23, wherein the system is included in a wearable technology product.

* * * * *